(12) United States Patent
Sexton et al.

(10) Patent No.: US 7,490,330 B2
(45) Date of Patent: Feb. 10, 2009

(54) USING A VIRTUAL MACHINE INSTANCE AS THE BASIC UNIT OF USER EXECUTION IN A SERVER ENVIRONMENT

(75) Inventors: Harlan Sexton, Menlo Park, CA (US); David Unietis, Menlo Park, CA (US); Mark Jungerman, San Francisco, CA (US); Scott Meyer, Pacifica, CA (US); David Rosenberg, Los Altos, CA (US)

(73) Assignee: Oracle International Corporation (OIC), Redwood Shores, CA (US)

( * ) Notice: Subject to any disclaimer, the term of this patent is extended or adjusted under 35 U.S.C. 154(b) by 656 days.

(21) Appl. No.: 11/032,577

(22) Filed: Jan. 10, 2005

(65) Prior Publication Data

US 2005/0132368 A1 Jun. 16, 2005

Related U.S. Application Data

(63) Continuation of application No. 09/512,620, filed on Feb. 25, 2000, now Pat. No. 6,854,114.

(60) Provisional application No. 60/185,139, filed on Feb. 25, 2000, provisional application No. 60/185,138, filed on Feb. 25, 2000, provisional application No. 60/185,137, filed on Feb. 25, 2000, provisional application No. 60/185,136, filed on Feb. 25, 2000, provisional application No. 60/185,135, filed on Feb. 25, 2000, provisional application No. 60/185,134, filed on Feb. 25, 2000, provisional application No. 60/160,759, filed on Oct. 21, 1999.

(51) Int. Cl.
*G06F 13/00* (2006.01)

(52) U.S. Cl. .................... 719/312; 718/1; 707/1; 707/8; 709/227; 709/228

(58) Field of Classification Search .................. 718/1, 718/101, 104; 709/200, 227, 228; 719/312; 707/1, 8
See application file for complete search history.

(56) References Cited

U.S. PATENT DOCUMENTS

| | | | | |
|---|---|---|---|---|
| 5,414,848 | A | 5/1995 | Sandage et al. | 395/650 |
| 5,692,193 | A | 11/1997 | Jagannathan et al. | 395/676 |
| 5,745,703 | A | 4/1998 | Cejtin et al. | 395/200.68 |
| 5,920,720 | A | 7/1999 | Toutonghi et al. | 395/705 |
| 6,047,053 | A * | 4/2000 | Miner et al. | 379/201.01 |
| 6,075,938 | A * | 6/2000 | Bugnion et al. | 703/27 |
| 6,223,202 | B1 | 4/2001 | Bayeh | 709/102 |

(Continued)

*Primary Examiner*—Andy Ho
(74) *Attorney, Agent, or Firm*—Hickman Palermo Truong & Becker LLP

(57) ABSTRACT

Techniques are provided for instantiating separate Java virtual machines for each session established by a server. Because each session has its own virtual machine, the Java programs executed by the server for each user connected to the server are insulated from the Java programs executed by the server for all other users connected to the server. The separate VM instances can be created and run, for example, in separate units of execution that are managed by the operating system of the platform on which the server is executing. For example, the separate VM instances may be executed either as separate processes, or using separate system threads. Because the units of execution used to run the separate VM instances are provided by the operating system, the operating system is able to ensure that the appropriate degree of insulation exists between the VM instances.

20 Claims, 3 Drawing Sheets

U.S. PATENT DOCUMENTS

| | | |
|---|---|---|
| 6,256,637 B1 * | 7/2001 | Venkatesh et al. ........ 707/103 Y |
| 6,269,391 B1 | 7/2001 | Gillespie .................... 709/100 |
| 6,282,702 B1 | 8/2001 | Ungar ............................ 717/5 |
| 6,324,177 B1 | 11/2001 | Howes et al. ................ 370/389 |
| 6,330,709 B1 | 12/2001 | Johnson et al. ................ 717/1 |
| 6,370,687 B1 | 4/2002 | Shimura ..................... 717/146 |
| 6,374,286 B1 | 4/2002 | Gee et al. ................... 709/108 |
| 6,393,605 B1 | 5/2002 | Loomans .................... 717/121 |
| 6,401,109 B1 * | 6/2002 | Heiney et al. ................... 718/1 |
| 6,457,142 B1 | 9/2002 | Klemm et al. ................. 714/38 |
| 6,463,480 B2 | 10/2002 | Kikuchi et al. .............. 709/315 |
| 6,519,594 B1 * | 2/2003 | Li ................................ 707/10 |
| 6,604,046 B1 | 8/2003 | Van Watermulen et al. . 701/208 |
| 6,609,153 B1 | 8/2003 | Salkewicz .................... 709/223 |
| 6,618,737 B2 | 9/2003 | Aridor et al. ................. 707/205 |
| 6,629,113 B1 | 9/2003 | Lawrence .................... 707/206 |

\* cited by examiner

USING A VIRTUAL MACHINE INSTANCE AS THE BASIC UNIT OF USER EXECUTION IN A SERVER ENVIRONMENT

The present application is a continuation of U.S. patent application Ser. No. 09/512,620 filed on Feb. 25, 2000 now U.S. Pat. No. 6,854,114, the contents of which are hereby incorporated by reference.

RELATED APPLICATIONS

The present application claims the benefit of the following U.S. Provisional Patent Applications, the contents of all of which are incorporated by reference in their entirety:

U.S. Provisional Patent Application Ser. No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al., U.S. Provisional Patent Application Ser. No. 60/185,136 entitled MEMORY MANAGEMENT USING MIGRATION FOR A RUN-TIME ENVIRONMENT, filed on Feb. 25, 2000 by Harlan Sexton et al.;

U.S. Provisional Patent Application Ser. No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton;

U.S. Provisional Patent Application Ser. No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;

U.S. Provisional Patent Application Ser. No. 60/185,134 entitled AURORA NATIVE COMPILATION, filed on Feb. 25, 2000 by Dmitry Nizhegorodov;

U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.; and U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer;

The present application is related to the following commonly-assigned, co-pending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al.; now U.S. Pat. No. 6,457,019;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al. now U.S. Pat. No. 6,499,095;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al. now U.S. Pat. No. 6,877,161;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al. now U.S. Pat. No. 6,434,685;

U.S. patent application Ser. No. 09/320,578 entitled METHOD AND ARTICLE FOR ACCESSING SLOTS OF PAGED OBJECTS, filed on May 27, 1999 by Harlan Sexton et al. now U.S. Pat. No. 6,401,185;

U.S. patent application Ser. No. 09/408,847 entitled METHOD AND ARTICLE FOR MANAGING REFERENCES TO EXTERNAL OBJECTS IN A RUNTIME ENVIRONMIENT, filed on Sep. 30, 1999 by Harlan Sexton et al. now U.S. Pat. No. 6,564,223;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al. now U.S. Pat. No. 6,711,657;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al. now U.S. Pat. No. 6,604,182;

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al. now U.S. Pat No. 7,093,263; and U.S. patent application Ser. No. 09/512,618 entitled METHOD AND APPARATUS FOR MANAGNG SHARED MEMORY IN A RUN-TIME ENVIRONMENT, filed on Feb. 25, 2000 by Harlan Sexton et al. now U.S. Pat. No. 6,829,761.

FIELD OF THE INVENTION

The present invention relates to computer systems and, more specifically, to using a virtual machine instance as the basic unit of user execution in a server environment.

BACKGROUND OF THE INVENTION

A virtual machine is software that acts as an interface between a computer program that has been compiled into instructions understood by the virtual machine and the microprocessor (or "hardware platform") that actually performs the program's instructions. Once a virtual machine has been provided for a platform, any program compiled for that virtual machine can run on that platform.

One popular virtual machine is known as the Java virtual machine (VM). The Java virtual machine specification defines an abstract rather than a real "machine" (or processor) and specifies an instruction set, a set of registers, a stack, a "garbage-collected heap," and a method area. The real implementation of this abstract or logically defined processor can be in other code that is recognized by the real processor or be built into the microchip processor itself.

The output of "compiling" a Java source program (a set of Java language statements) is called bytecode. A Java virtual machine can either interpret the bytecode one instruction at a time (mapping it to one or more real microprocessor instructions) or the bytecode can be compiled further for the real microprocessor using what is called a just-in-time (JIT) compiler.

The Java programming language supports multi-threading, and therefore Java virtual machines must incorporate multi-threading capabilities. Multi-threaded computing environments allow different parts of a program, known as threads, to execute simultaneously. In recent years, multithreaded computing environments have become more popular because of the favorable performance characteristics provided by multi-threaded applications.

Compared to the execution of processes in a multiprocessing environment, the execution of threads may be started and stopped very quickly because there is less runtime state to save and restore. The ability to quickly switch between threads can provide a relatively high level of data concurrency. In the context of a multi-threaded environment, data concurrency refers to the ability for multiple threads to concurrently access the same data. When the multi-threaded environment is a multi-processor system, each thread may be executed on a separate processor, thus allowing multiple threads to access shared data simultaneously.

Java is gaining acceptance as a language for enterprise computing. In an enterprise environment, the Java programs may run as part of a large-scale server to which many users have concurrent access. A Java virtual machine with multi-threading capabilities may spawn or destroy threads as necessary to handle the current workload. For example, a multi-threading Java virtual machine may be executing a first Java program in a first thread. While the first Java program is executing, the server may receive a request to execute a second Java program. Under these circumstances, the server may respond to the request by causing the Java virtual machine to spawn a second thread for executing the second Java program.

Despite the favorable performance characteristics provided by multithreaded computing environments, they are not without their disadvantages. Specifically, in multithreaded applications, maintaining the integrity of data structures and variables can be particularly challenging since more than one thread can access the same data simultaneously. Unlike processes in multiprocessing environments, threads typically share a single address space and a set of global variables and are primarily distinguished by the value of their program counters and stack pointers. Consequently, the state of some commonly accessible data can be undergoing a change by one thread at the same time that it is being read by another thread, thus making the data unreliable.

Typically, servers that incorporate multi-threading Java virtual machines are configured to spawn a separate thread for each user session. For example, a web server may execute a thread that listens for a connection to be established (e.g. an HTTP request to arrive) through a particular port. When a connection is established, the listening thread passes the connection to another thread. The selected thread services the request, sends any results of the service back to the client, and blocks again, awaiting another connection. Alternatively, each socket through which a connection may be established may be assigned to a specific thread, and all connections made through a given socket are serviced by the associated thread.

Because the threads execute within the same Java virtual machine, the user sessions share the state information required by the virtual machine. Such state information includes, for example, the bytecode for all of the system classes. While such state sharing tends to reduce the resource overhead required to concurrently service the requests, it presents reliability and security problems. Specifically, the bytecode being executed for first user in a first thread has access to information and resources that are shared with the bytecode being executed by a second user in a second thread. If either thread modifies or corrupts the shared information, or monopolizes the resources, the integrity of the other thread may be compromised.

To avoid such problems, the designer of a Java program that is going to be used in a multi-user server environment where each session is assigned a separate thread must implement the Java program in a way that avoids altering shared state or conflict over resources with other Java programs executing in other threads within the same virtual machine. Unfortunately, the provider of the server may have little control over how Java program designers implement their Java programs.

The thread-per-session nature of the server also complicates the task of garbage collection. For example, the threads associated with many sessions may be actively performing operations that create and consume resources, while the thread associated with another session may be trying to perform garbage collection within the same pool of resources. The negative impact of the garbage collection operation on the performance of the other threads is such that many implementations avoid the situation in which some threads are working and others are performing garbage collection by synchronizing the performance of garbage collection among all the threads. However, synchronizing the performance of garbage collection also has a negative impact on the performance of the server, causing all threads to cease working at the same time in order for the garbage collection to be performed.

Further, garbage collection in a thread-per-session environment is complicated by the fact that one of the sessions may encounter problems that cause the session to stall. The resources allocated for that session are not garbage collected because "live" pointers to those resources are not distinguishable from the live pointers associated with threads that have not stalled.

In a thread-per-session environment, threads share access to modifiable data items. To maintain the integrity of such data items, a memory manager is used to serialize access. Unfortunately, the memory manager within a thread-per-session system can very quickly become a bottleneck. In general, the larger the number of threads, the greater the contention between the threads for control of resources managed by the memory manager. Consequently, conventional VM servers that are implemented using a thread-per-session approach tend to suffer severe performance penalties as the number of sessions grows beyond a certain threshold.

Based on the foregoing, it is clearly desirable to implement a server that allows multiple users to concurrently execute Java programs within sessions established with a server, but which does not rely on the Java program designers to implement their programs in such a way as to make them safe in a multi-threading environment. It is further desirable to provide a scalable server that avoids the performance penalties associated with threads competing for resources.

SUMMARY OF THE INVENTION

Techniques are provided for instantiating separate Java virtual machines for each session established by a server. Because each session has its own virtual machine, the Java programs executed by the server for each user connected to the server are insulated from the Java programs executed by the server for all other users connected to the server. The separate VM instances can be created and run, for example, in separate units of execution that are managed by the operating system of the platform on which the server is executing. For example, the separate VM instances may be executed either as separate processes, or using separate system threads. Because the units of execution used to run the separate VM instances are provided by the operating system, the operating system is able to ensure that the appropriate degree of insulation exists between the VM instances.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
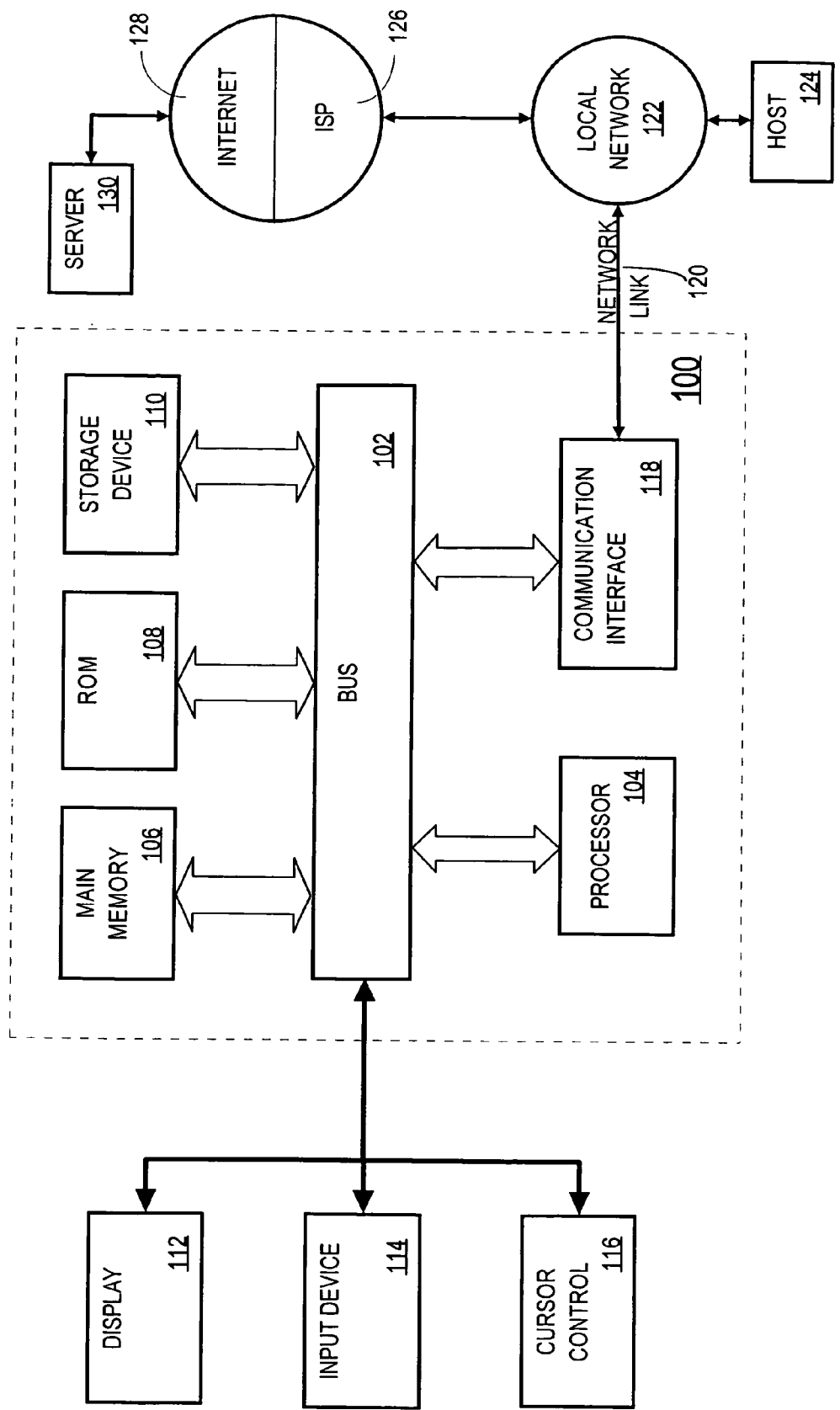
FIG. 1 is a block diagram of a computer system on which embodiments of the invention may be implemented.

A method and apparatus are described for securely and concurrently executing Java programs in a multi-user server environment. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for instantiating separate Java virtual machines for each session established by a server. Because each session has its own virtual machine, the Java programs executed by the server for each user connected to the server are insulated from the Java programs executed by the server for all other users connected to the server. The separate VM instances can be created and run, for example, in separate units of execution that are managed by the operating system of the platform on which the server is executing. For example, the separate VM instances may be executed either as separate processes, or using separate system threads. Because the units of execution used to run the separate VM instances are provided by the operating system, the operating system is able to ensure that the appropriate degree of insulation exists between the VM instances.

Because each session is assigned its own VM instance, the VM threads that are part of one VM instance do not have to compete for the same VM resources as the VM threads that are part of a different VM instance. For example, garbage collection can be performed in the VM instance associated with one session without negatively affecting the performance of another session because the other session is associated with an entirely separate VM instance.

In addition, techniques are provided for reducing startup costs and incremental memory requirements of the Java virtual machines instantiated by the server. For example, the use of a shared state area allows the various VM instantiations to share class definitions and other resources. In addition, while it is actively processing a call, each VM instance has two components, a session-duration component and a call-duration component. Only the data that must persist in the VM between calls is stored in the session-duration component. Data that need not persist between calls is stored in the call-duration component, which is instantiated at the start of a call, and discarded at the termination of the call.

As shall be explained in greater detail hereafter, the state used by the VM is encapsulated into a "VM context" argument. The VM context is passed as an argument to all internal VM functions. Specifically, when the server receives a call during a session with a client, and the call requires execution of code by a virtual machine, the VM instance associated with that session is executed in a system thread or process. If no VM instance has been established for the session on which the call arrived, a VM instance for the session is instantiated in session memory. In response to the call, a call-duration component of the VM instance is instantiated in call memory. During the call, a VM context that includes pointers to the VM instance is passed as an argument to methods invoked within the VM instance. Those methods change the state of the VM by manipulating data within the VM instance. At the end of the call, any data within the call-duration component that must persist between calls is transferred to the session-duration component in session memory, and the call-duration component is discarded.

Memory Model

Figure 2:
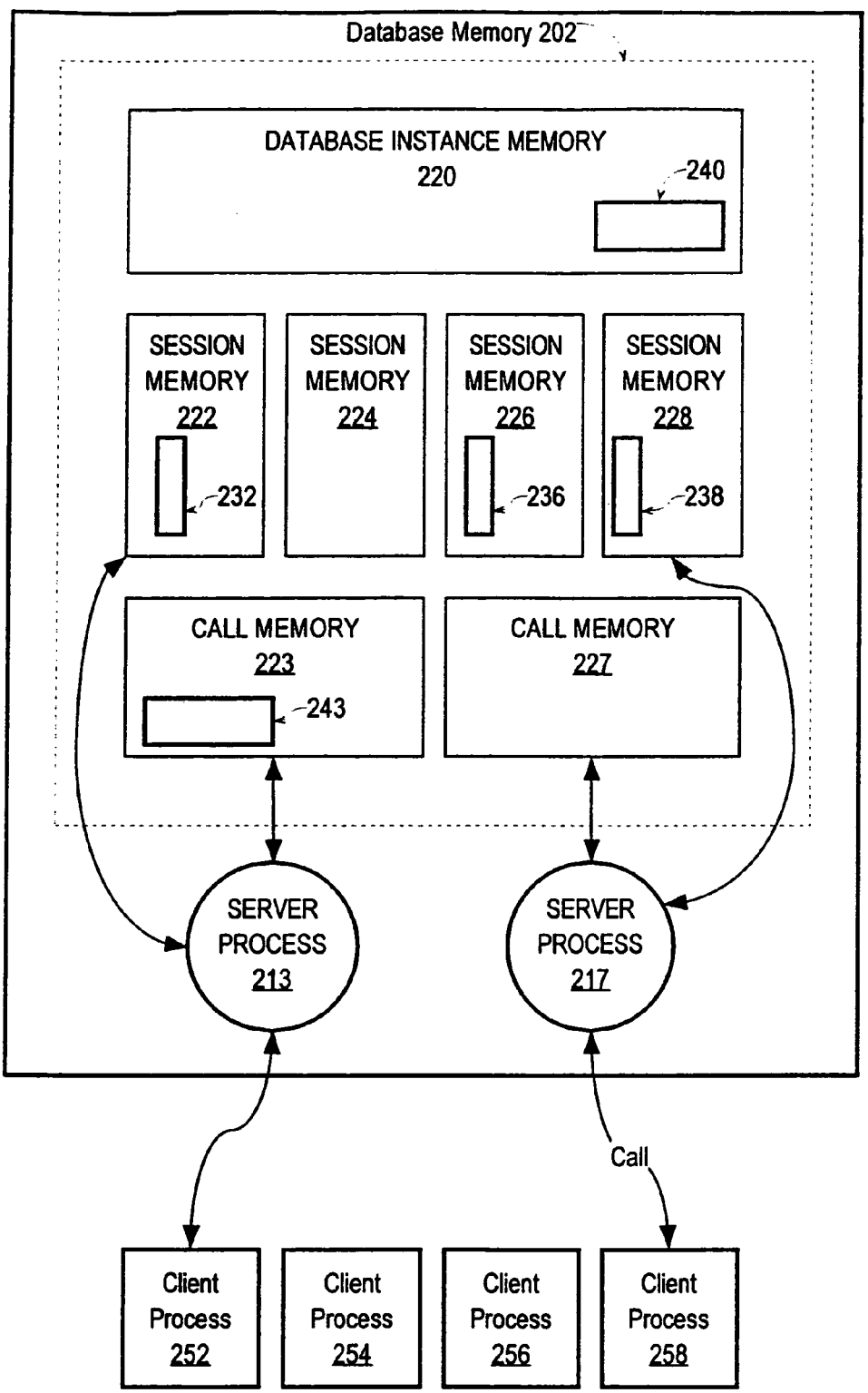
FIG. 2 is a block diagram of a database server that implements a VM-instance-per-session policy according to an embodiment of the invention.

FIG. 2 schematically illustrates a system 200 with which a run-time environment for a language such as JAVA is used. The system 200 provides a server with which multiple concurrent users can establish sessions. The present invention is not limited to servers that are directed to any particular type of application. For example, the server may be a database server, an HITP server, a name server, an application server, or any other type of server that (1) supports multiple concurrent sessions, and (2) provides at least one service that involves executing dynamic language code using a virtual machine (or "interpreter"). For the purpose of explanation, an embodiment shall be described in which the server is a database server.

In the illustrated configuration, client processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, this longer-duration memory area may be used to store the read-only data and instructions (e.g. bytecodes of JAVA classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are memories used to store static data, i.e., data associated with a user that is preserved for the duration of a series of calls, especially between calls issued by a client during a single database session. JAVA class variables are one example of such static data.

According to one embodiment, the system threads or processes that ultimately execute calls from clients are not dedicated to handling calls from any particular session or client. Rather, the system threads belong to a "system thread pool" from which threads are assigned to handle calls as they arrive. In one embodiment, all system threads in the pool are given shared access to the session memories to allow any given system thread to be assigned to handle a call that arrived in any given session.

In an alternative embodiment, even system threads that do not have access to the memory containing a VM instance may be assigned to execute a call that involves the VM instance. When a system thread that does not have access to the memory containing a VM instance is assigned to execute the VM instance, the data structure that encapsulates the VM instance is transported to a memory to which the system thread has access. This may involve, for example, sending the data structure from the memory in one machine in a cluster to the memory of another machine in the cluster.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258. Because the lifetime of objects in a call memory associated with a call is shorter than the lifetime of objects stored in the session memory associated with the session in which the call was made, call memory is said to be a "shorter-duration" memory relative to the session memory. Conversely, session memory is "longer-duration" memory relative to call memory.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handle its various calls. At any given time, the number of calls requiring execution by a server process is typically much fewer than the current number of active clients. Thus, database system 200 is typically configured to execute fewer server processes than the maximum number of active clients.

Using One Virtual Machine Instance Per Session

As mentioned above, in the conventional Java server model, each session initiated between a client and the server is handled by a single VM thread within a multi-threaded VM instance. In such an implementation, the Java virtual machine itself takes the form of a set of global variables accessible to all threads, where there is only one copy of each global variable. Unlike the conventional Java server, in one embodiment of the invention, an entire Java VM instance is spawned for every session made through the server. According to one implementation, each Java VM instance is spawned by instantiating a VM data structure in session memory. During execution, the state of a VM instance is modified by performing transformations on the VM data structure associated with the VM instance, and/or modifying the data contained therein. Specifically, the VM data structure that is instantiated for a particular session is passed as an input parameter to the server routines that are called during that session. Rather than accessing global variables that are shared among VM threads associated with different sessions, the routines access session-specific variables that are stored within the VM data structure that is passed to them. Consequently, the contention for resources that otherwise occurs between threads associated with different sessions is significantly reduced, because those threads are associated with different VM instances.

Because each VM data structure is associated with a single user/session, the VM functionality can be optimized based on knowledge of what is occurring in that session. For example, according to one embodiment, the VM instance associated with a session takes into account when calls are made within the session, and when calls are completed within the session. In particular, at the time a call is made, a call memory, separate from the session memory associated with the session, may be allocated. During a call, memory for storing data is allocated from call memory associated with the session. Some of the data thus stored may be for static variables that endure beyond the call. When the call finishes, a transitive closure operation is performed from all of the static variables, and any data identified in the call memory during the transitive closure operation is moved to session memory. After the identified data has been moved, the call memory is deallocated. If no changes were made to session space, then garbage collection may be skipped completely.

The Shared State Area

According to one embodiment, the overhead associated with each VM instance is reduced by sharing certain data with other VM instances. The memory structure that contains the shared data is referred to herein as the shared state area. Each VM instance has read-only access to the data that has been loaded into the shared state area, and therefore the VM instances do not contend with each other for access rights to that data. According to one embodiment, the shared state area is used to store loaded Java classes.

The shared Java classes may include static variables whose values are session-specific. Therefore, according to one embodiment, a data structure, referred to herein as a "java_active_class", is instantiated in session space to store session-specific values (e.g. static variables) of a corresponding shared Java class. The non-session-specific data for the class, including the methods, method table and fields, are not duplicated in the session memory for each VM instance. Rather, all VM instances share read-only access to a single instantiation of the class, thus significantly reducing the memory requirements of VM instances (the per-session memory requirements). According to one embodiment, the java_active_class for each shared class further includes a pointer to the shared class to allow VM instances more efficient access to the shared class data.

Figure 3:
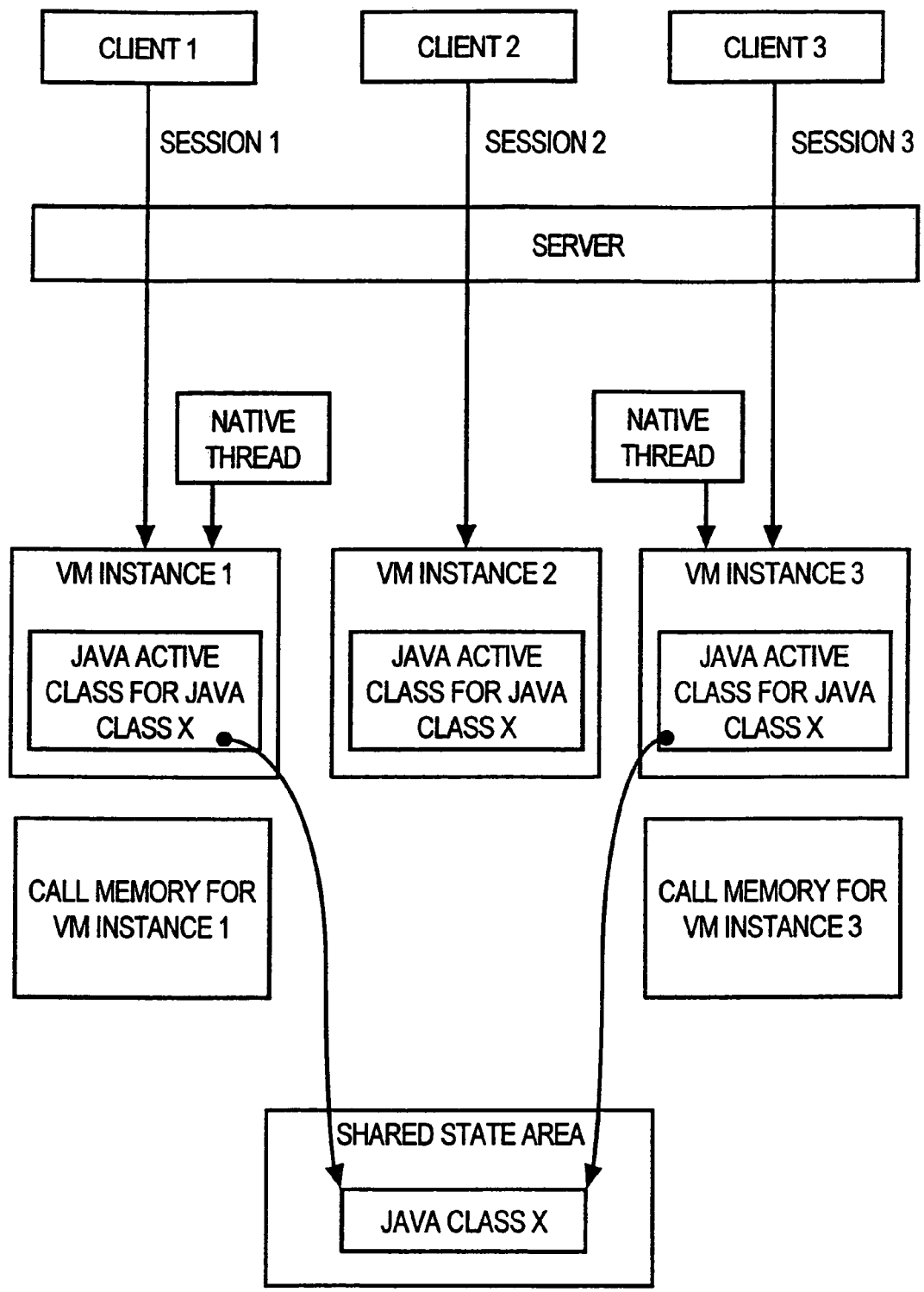
FIG. 3 is a block diagram of a plurality of VM instances sharing access to data within a shared state area

FIG. 3 is a block diagram showing multiple VM instances accessing a shared state area. Referring to FIG. 3, three clients have established three sessions through a server. In session 1, a call that involves services provided by the virtual machine is currently being processed by a system thread using VM instance 1. In session 3, a call that involves services provided by the virtual machine is currently being processed by a system thread using VM instance 3. Both VM instance 1 and VM instance 3 share access to the shared state area, which in the illustrated embodiment includes data for Java class X.

In session 2, no call is currently active. The call memory associated with any previous call has been discarded. Only the session memory of VM instance 2 remains allocated. Because session 2 is not currently processing a call that makes use of VM instance 2, VM instance 2 is not currently assigned to any system thread.

According to one embodiment, a pointer to the shared state area is passed as an argument with every call, thereby providing each called routine efficient access to the shared data. The various VM instances instantiated within the server may actually be created and run in either separate processes, or using system threads.

Asynchronous Call Processing

According to one embodiment, when a request associated with a session is received by the server, and the request involves execution of dynamic code, the request is queued. A dispatcher arranges for the requests from the queue to be executed. If a request is part of a session for which a VM instance has already been instantiated, the dispatcher arranges for the request to be executed within that VM instance. However, that VM instance is "virtual" in that only session-duration data associated with the instance are maintained between calls. Call-duration data structures, such as the call stack of the VM instance, are actually discarded between calls. Consequently, upon a subsequent call within the same session, a call stack and other call-duration structures have to be reallocated and reconstructed. Further, the system thread assigned to execute a VM instance in response to one call in a session may be entirely different than the system thread assigned to execute the same VM instance in response to a previous call in the same session.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are implemented by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application implements the techniques described herein.

The received code may be executed by processor 104 as it is received, and/or stored in storage device 110, or other non-volatile storage for later execution. In this manner, computer system 100 may obtain application code in the form of a carrier wave.

Variations and Alternatives

Embodiments of the invention have been described in which the Java virtual machine is used to service requests that are issued to a server that supports multiple concurrent sessions. However, the techniques described herein are not limited to the virtual machine of any particular dynamic language. For example, any server that supports multiple concurrent sessions and provides a service that involves executing the virtual machine of any dynamic language may implement the virtual-machine-instance-per-session techniques described herein. Such dynamic languages may include, but are not limited to, Smalltalk and LISP. Further, while Java is a multi-threaded language, the dynamic language employed by a server that implements the techniques described herein need not contain multi-threading support.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for servicing requests received by a database system in a multiple-user environment, the method comprising the steps of:
   spawning a first process executing a first virtual machine instance in response to establishing a first database session between the database system and a first user;
   spawning a second process executing a second virtual machine instance in response to establishing a second database session between the database system and a second user;
   responding to requests that are received by the database system in said first session by executing virtual machine code using the first virtual machine instance;
   responding to requests that are received by the database system in said second session by executing the virtual machine code using the second virtual machine instance;
   wherein said first virtual machine instance and said second virtual machine instance share access to data stored in a shared state area;
   wherein said first virtual machine instance and said second virtual machine instance share read-only access to said data stored in said shared state area;
   wherein said shared state area stores an object class;
   wherein said first virtual machine instance stores, in session-specific memory associated with said first virtual machine instance, a first value for a static variable associated with said object class; and
   wherein said second virtual machine instance stores, in session-specific memory associated with said second virtual machine instance, a second value for said static variable associated with said object class.

2. The method of claim 1 further comprising the step of sharing, between said first virtual machine instance and said second virtual machine instance, a set of one or more resources within said shared state area.

3. The method of claim 2 wherein the step of sharing a set of one or more resources includes sharing data associated with an object class.

4. The method of claim 1 further comprising the steps of:
   responding to a call associated with a particular session with the database system by allocating a call memory for the particular virtual machine instance associated with said particular database session; and
   discarding said call memory upon termination of said call.

5. The method of claim 1 further comprising the step of:
   responding to a call associated with a particular session with the database system by scheduling, for execution in a system thread, the particular virtual machine instance associated with said particular database session.

6. The method of claim 1 further comprising the steps of:
   spawning the first virtual machine instance by instantiating a data structure; and
   changing the state of said first virtual machine instance during execution of said virtual machine code by manipulating data within said data structure.

7. The method of claim 1, wherein:
   said shared state area includes static data;
   said static data are established as read-only data within the shared state area; and
   the method further comprises, in response to performing an operation that requires said static data stored in the shared state area, the first virtual machine instance copying the static data from the shared state area into volatile memory associated with the first virtual machine instance.

8. The method of claim 1, wherein said first virtual machine instance and said second virtual machine instance each maintains virtual machine instance session specific data and virtual machine instance call specific data separate from the share state area.

9. The method of claim 1, wherein:
   said first virtual machine instance stores, in said session-specific memory, associated with said first virtual machine instance, a pointer to said object class in said shared state area; and said second virtual machine instance stores, in said session-specific memory, associated with said second virtual machine instance, a pointer to said object class in shared state area.

10. The method of claim 1, further comprising allocating the shared state area within a database instance memory of a database instance that belongs to the database system.

11. A computer-readable storage medium storing instructions for servicing requests received by a server in a multiple-user environment, the instructions comprising instructions for performing the steps of:
spawning a first process executing a first virtual machine instance in response to establishing a first database session between the database system and a first user;
spawning a second process executing a second virtual machine instance in response to establishing a second database session between the database system and a second user;
responding to requests that are received by the database system in said first session by executing virtual machine code using the first virtual machine instance;
responding to requests that are received by the database system in said second session by executing the virtual machine code using the second virtual machine instance;
wherein said first virtual machine instance and said second virtual machine instance share access to data stored in a shared state area allocated in volatile memory;
wherein said first virtual machine instance and said second virtual machine instance share read-only access to said data stored in said shared state area;
wherein said shared state area stores an object class;
wherein said first virtual machine instance stores, in session-specific memory associated with said first virtual machine instance, a first value for a static variable associated with said object class; and
wherein said second virtual machine instance stores, in session-specific memory associated with said second virtual machine instance, a second value for said static variable associated with said object class.

12. The computer-readable storage medium of claim 11, further comprising instructions for performing the steps of:
sharing, between said first virtual machine instance and said second virtual machine instance, a set of one or more resources within said shared state area.

13. The computer-readable storage medium of claim 11, wherein the step of sharing a set of one or more resources includes sharing data associated with an object class.

14. The computer-readable storage medium of claim 11, further comprising instructions for performing the steps of:
responding to a call associated with a particular session with the database system by allocating a call memory for the particular virtual machine instance associated with said particular database session; and
discarding said call memory upon termination of said call.

15. The computer-readable storage medium of claim 11, further comprising instructions for performing the steps of:
responding to a call associated with a particular session with the database system by scheduling, for execution in a system thread, the particular virtual machine instance associated with said particular database session.

16. The computer-readable storage medium of claim 11, further comprising instructions for performing the steps of:
spawning the first virtual machine instance by instantiating a data structure; and
changing the state of said first virtual machine instance during execution of said virtual machine code by manipulating data within said data structure.

17. The computer-readable storage medium of claim 11, wherein:
the shared state area includes static data;
the static data are established as read-only data within the shared state area; and
the computer-readable storage medium further comprises instructions for performing the steps of:
in response to performing an operation that requires said static data stored in the shared state area, the first virtual machine instance copying the static data from the shared state area into volatile memory associated with the first virtual machine instance.

18. The computer-readable storage medium of claim 11, wherein said first virtual machine instance and said second virtual machine instance each maintains virtual machine instance session specific data and virtual machine instance call specific data separate from the share state area.

19. The computer-readable storage medium of claim 11, wherein:
said first virtual machine instance stores, in said session-specific memory, associated with said first virtual machine instance, a pointer to said object class in said shared state area; and
said second virtual machine instance stores, in said session-specific memory, associated with said second virtual machine instance, a pointer to said object class in said shared state area.

20. The computer-readable storage medium of claim 11, further comprising instructions for performing the steps of allocating the shared state area within a database instance memory of a database instance that belongs to the database system.

* * * * *

UNITED STATES PATENT AND TRADEMARK OFFICE
CERTIFICATE OF CORRECTION

PATENT NO. : 7,490,330 B2
APPLICATION NO. : 11/032577
DATED : February 10, 2009
INVENTOR(S) : Sexton et al.

It is certified that error appears in the above-identified patent and that said Letters Patent is hereby corrected as shown below:

In column 2, line 7-8, delete "ENVIRONMIENT," and insert -- ENVIRONMENT, --, therefor.

In column 2, line 12, delete "INITALIZATION" and insert -- INITIALIZATION --, therefor.

In column 2, line 27, delete "MANAGNG" and insert -- MANAGING --, therefor.

In column 5, line 13, after "area" insert -- . --.

In column 6, line 27, delete "HITP" and insert -- HTTP --, therefor.

Signed and Sealed this

Eighteenth Day of May, 2010

David J. Kappos
*Director of the United States Patent and Trademark Office*